US009668607B2

(12) United States Patent
Bruinsma et al.

(10) Patent No.: US 9,668,607 B2
(45) Date of Patent: Jun. 6, 2017

(54) MANUALLY OPERATED IN-CUP MILK FROTHING APPLIANCE

(71) Applicant: KONINKLIJKE PHILIPS N.V., Eindhoven (NL)

(72) Inventors: Rodin Enne Bruinsma, Eindhoven (NL); Mark Ronald Van Der Woning, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 381 days.

(21) Appl. No.: 14/368,593

(22) PCT Filed: Dec. 18, 2012

(86) PCT No.: PCT/IB2012/057408
§ 371 (c)(1),
(2) Date: Jun. 25, 2014

(87) PCT Pub. No.: WO2013/098710
PCT Pub. Date: Jul. 4, 2013

(65) Prior Publication Data
US 2014/0373735 A1    Dec. 25, 2014

Related U.S. Application Data

(60) Provisional application No. 61/581,126, filed on Dec. 29, 2011.

(51) Int. Cl.
A47J 31/44    (2006.01)
(52) U.S. Cl.
CPC ........... A47J 31/44 (2013.01); A47J 31/4489 (2013.01)

(58) Field of Classification Search
CPC .................... A47J 31/44; A47J 31/4489
USPC ...... 99/281, 285, 287, 293, 295, 302 P, 303;
426/115, 474; 222/1, 95, 137, 190, 207, 222/283, 290, 302 R
See application file for complete search history.

(56) References Cited

U.S. PATENT DOCUMENTS

| 4,763,566 | A  | 8/1988 | Paoletti |
| 5,017,759 | A  | 5/1991 | Baldacci |
| 5,335,588 | A  | 8/1994 | Mahlich |
| 6,062,127 | A  | 5/2000 | Klosinski |
| 7,178,453 | B2 | 2/2007 | In Albon |
| 7,669,517 | B2 | 3/2010 | Boussemart |

(Continued)

FOREIGN PATENT DOCUMENTS

| DE | 20318806 U1 | 5/2004 |
| GB | 2476066 A | 6/2011 |
| WO | 2007144735 A2 | 12/2007 |

(Continued)

Primary Examiner — Thien S Tran

(57) ABSTRACT

A milk frothing appliance including a water reservoir; a steam generator; a milk frothing device that is fluidly connected to the steam generator; and a hand pump that is fluidly connected to both the water reservoir and the steam generator. The hand pump including a manually operable actuator that is moveable between a first actuator position and a second actuator position, and that upon movement from the first actuator position into the second actuator position causes displacement of fluid from the water reservoir to the steam generator. The actuator is further moveable between a third actuator position and a fourth actuator position.

15 Claims, 6 Drawing Sheets

(56) References Cited

U.S. PATENT DOCUMENTS

2008/0083783 A1* 4/2008 Nelson ............... B05B 11/3087
222/153.13

FOREIGN PATENT DOCUMENTS

| WO | 2008128609 A1 | 10/2008 |
| WO | 2011158171 A1 | 12/2011 |

* cited by examiner

MANUALLY OPERATED IN-CUP MILK FROTHING APPLIANCE

This application is the U.S. National Phase application under 35 U.S.C. §371 of International Application No. PCT/IB2012/057408, filed on Dec. 18, 2012, which claims the benefit of U.S. Provisional Application No. 61/581,126 filed on Dec. 29, 2011. These applications are hereby incorporated by reference herein.

FIELD OF THE INVENTION

The present invention relates to an apparatus for frothing a liquid food product. Since apparatus of this type are commonly used to froth milk, the apparatus is referred to as a milk frothing appliance in the text that follows.

BACKGROUND

Milk frothing appliances are available in different types. Some milk frothing appliances, for instance, are integrated into coffee machines, while others are configured for stand-alone use.

An example of an integrated milk frothing appliance is the 'steam wand' that is customarily built-in in espresso machines. To froth milk, a steam outlet of the steam wand is positioned in a cup of milk, at or just below the surface of the milk. Then the steam wand is turned on so as to effect the ejection of a jet of steam that, as it impacts the air-milk interface, causes the production of an milk-air-steam mixture which results in the desired froth. A disadvantage of the steam wand is that its operation requires skill on the part of the user, in particular since the optimal position of the steam outlet relative to the milk surface is rather sensitive.

To simplify the production of milk froth, especially for home users, various dedicated stand-alone milk frothing devices have been developed. Some make use of an internal heatable tank for receiving a milk-based liquid, in which a rotatably drivable stirrer or whisk is positioned for whipping the liquid into a froth. Others mimic the operation of a steam wand, and include a modified, typically Venturi-based steam outlet nozzle that assists in the act of frothing by siphoning milk from a cup, mixing it with air and steam, and dispensing it back into the cup it came from.

Known dedicated milk frothing devices are typically electrically powered devices that include plenty of electronics. Besides a heater, such electronics may include an electric motor to drive the stirrer, or alternatively, in the case of a steam wand-mimicking device, a solenoid pump and several valves as part of a water dosing system configured to deliver water successively to the electric heater and an outlet of the steam wand. In addition, the milk frothing device may include internal electronics such as a central controller that controls the operation of the entire device, and for example allows a user to set certain operating parameters—e.g. heater temperature, whisking time, steam quantity, etc.—in dependence of the liquid to be frothed and its volume. The device may further be fitted with a plurality of external controls to enable a user to input the desired parameters.

The electronic components in known milk frothing devices make their manufacture rather costly, and their operation in generally humid kitchen environments susceptible to failure. The risk of moist-induced defects is particularly imminent for stirrer-type frothers, of which at least the internal liquid tank must be thoroughly cleaned after each use to maintain the hygiene of the device. Furthermore, the external user controls necessary to operate the full functionality of milk frothing device may normally be positioned on an outside of the device and, and may so mar an otherwise aesthetically pleasing, stylishly clean appearance.

SUMMARY OF THE INVENTION

It is an object of the present invention to provide for a milk frothing device that overcomes or mitigates one or more of the aforementioned drawbacks associated with known milk frothers. More in particular, it is an object of the present invention to provide for a milk frothing device that is economically manufacturable, reliable, does not demand extensive cleaning after use and enables a design free of a plurality of external controls.

To this end, a first aspect of the present invention is directed to a milk frothing appliance. The appliance may comprise a water reservoir for holding water, a steam generator for evaporating water, and a milk frothing device for frothing milk with the aid of steam, which device is fluidly connected to the steam generator. The appliance may further include a hand pump that is fluidly connected to both the water reservoir and the steam generator, and may comprise a manually operable actuator that is moveable between a first actuator position and a second actuator position, and that upon movement from the first actuator position into the second actuator position causes displacement of fluid from the water reservoir to the steam generator.

The mechanical hand pump in the presently disclosed appliance eliminates the need for a complex electric pump, and thus renders the appliance relatively economic to manufacture. It also makes the appliance more reliable since the hand pump is less prone to (in particular moist-induced) defects than an electrical pump. In addition, it may instill a sense of workmanship into the user as he has to apply a little muscular strength to the actuator in order to force water from the water reservoir into the steam generator. The hand pump may preferably be configured such that one actuator or pump stroke displaces about 0.5-5 ml of water, enabling an amount of steam sufficient for a typical cup of milk froth to be generated through about one to three pump strokes.

Importantly, the actuator of the hand pump may effectively be the only user control on the appliance and allow for a very clean, quiet design.

The hand pump actuator's first and second positions may be defined differently in different embodiments. For instance, in one embodiment the hand pump may be a lever pump, and the actuator may take the form of a lever that is hingable between a first and a second angular orientation. In another embodiment, the hand pump may for example be a screw pump, and the actuator may be connected to the rotatable screw such that its first and second positions may define different rotational positions relative to the screw's axis spindle. In a preferred embodiment, the hand pump actuator functionality may be realized by configuring the actuator such that it is moveable between the first actuator position and the second actuator position by translation along a first, central or longitudinal axis of the appliance. The central or longitudinal axis of the appliance may typically extend vertically during normal use, such that in particular a manual push force exerted on the actuator to move it from the first actuator position to the second actuator position is automatically balanced by the surface that supports the appliance as a whole, e.g. a kitchen working top.

Additional functionality, e.g. an electric on/off switch function for in particular the steam generator, may be integrated into the actuator by configuring it such that it is additionally moveable between a third actuator position and a fourth actuator position, preferably by rotation around the first axis. Such a configuration eliminates the need for an extra control switch on the outside of the appliance, and may thus contributes to the quiet design thereof.

In one embodiment the above-mentioned two functions of the actuator may be coupled; after all, displacing water from the water reservoir to the heat generator makes sense only— and should therefore be allowed only—when the appliance is electrically switched on and the steam generator is electrically powered. The actuator in the third actuator position, i.e. the electrical OFF-position, may therefore be locked against movement between the first actuator position and the second actuator position, while the actuator in the fourth actuator position, i.e. the electrical ON-position, may be moveable between the first actuator position and the second actuator position.

The appliance may be used as a stand-alone appliance, or be integrated into a coffee machine, e.g. an espresso machine.

These and other features and advantages of the invention will be more fully understood from the following detailed description of certain embodiments of the invention, taken together with the accompanying drawings, which are meant to illustrate and not to limit the invention.

DETAILED DESCRIPTION

FIGS. 1-6 schematically illustrate an exemplary embodiment of a milk frothing appliance 1 according to the present invention, whose construction and operation are discussed below.

Figure 1:
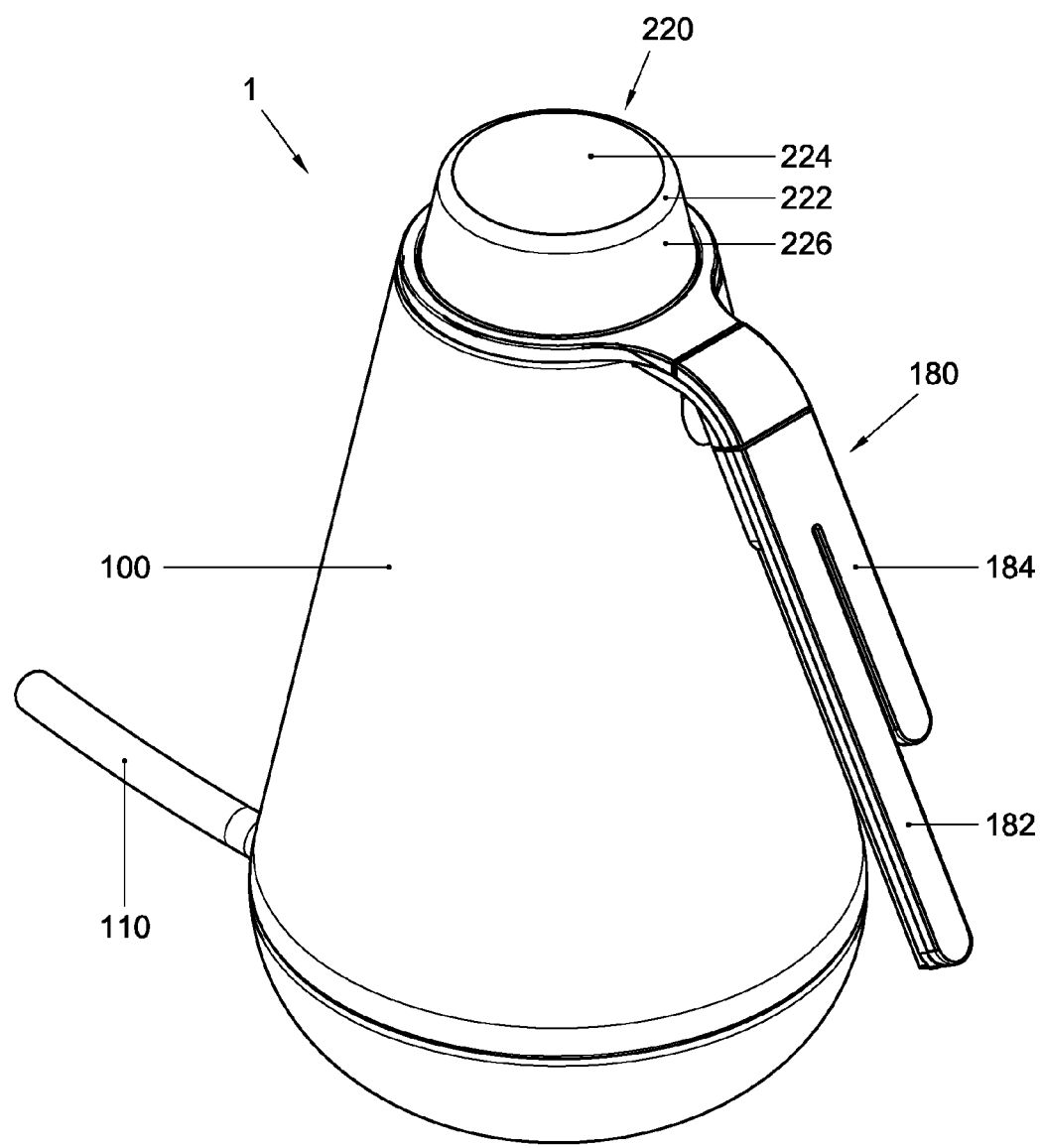
FIG. 1 is a schematic perspective view of an exemplary milk frothing appliance according to the present invention, comprising a body and an actuator disposed on top thereof.
Figure 2:
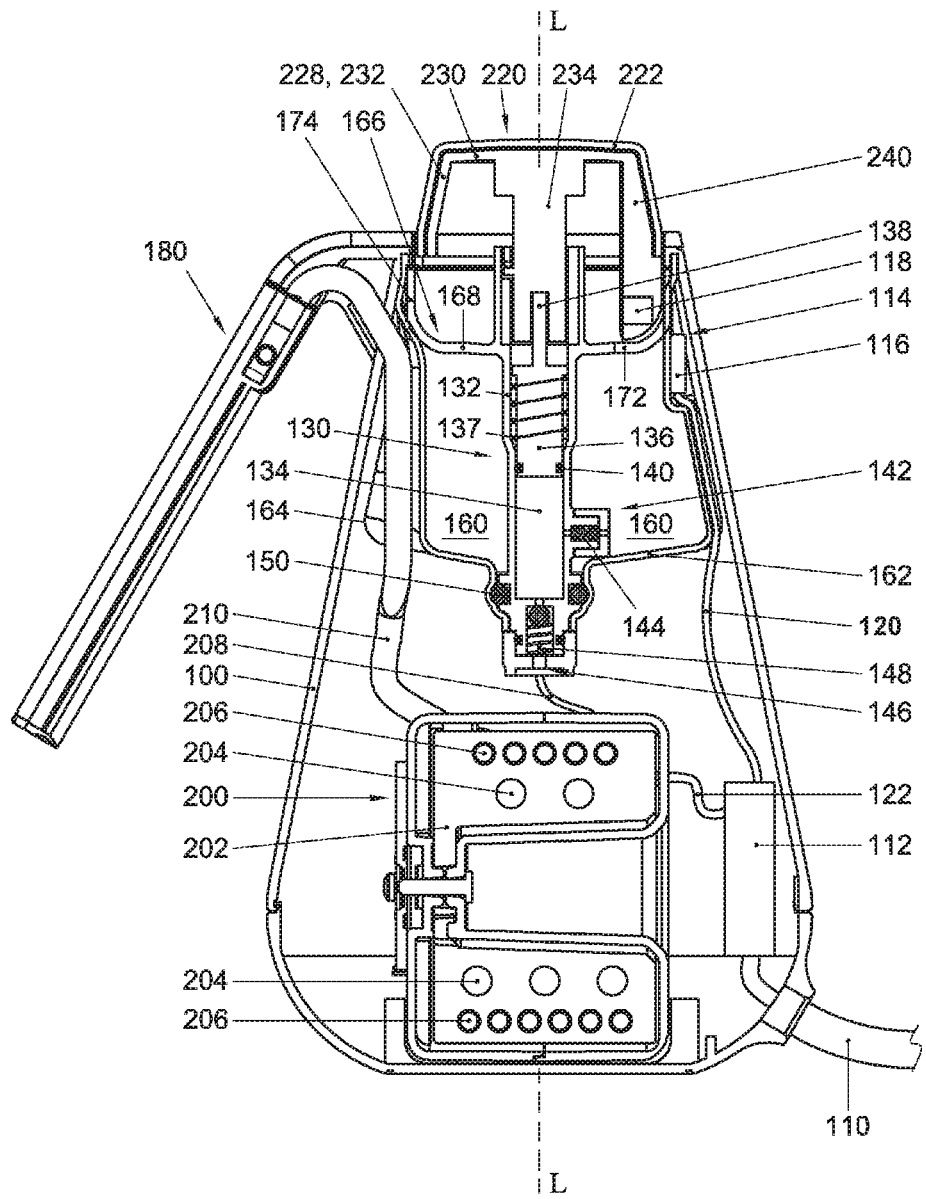
FIG. 2 is a schematic cross-sectional side view of the milk frothing appliance shown in FIG. 1.
Figure 3:
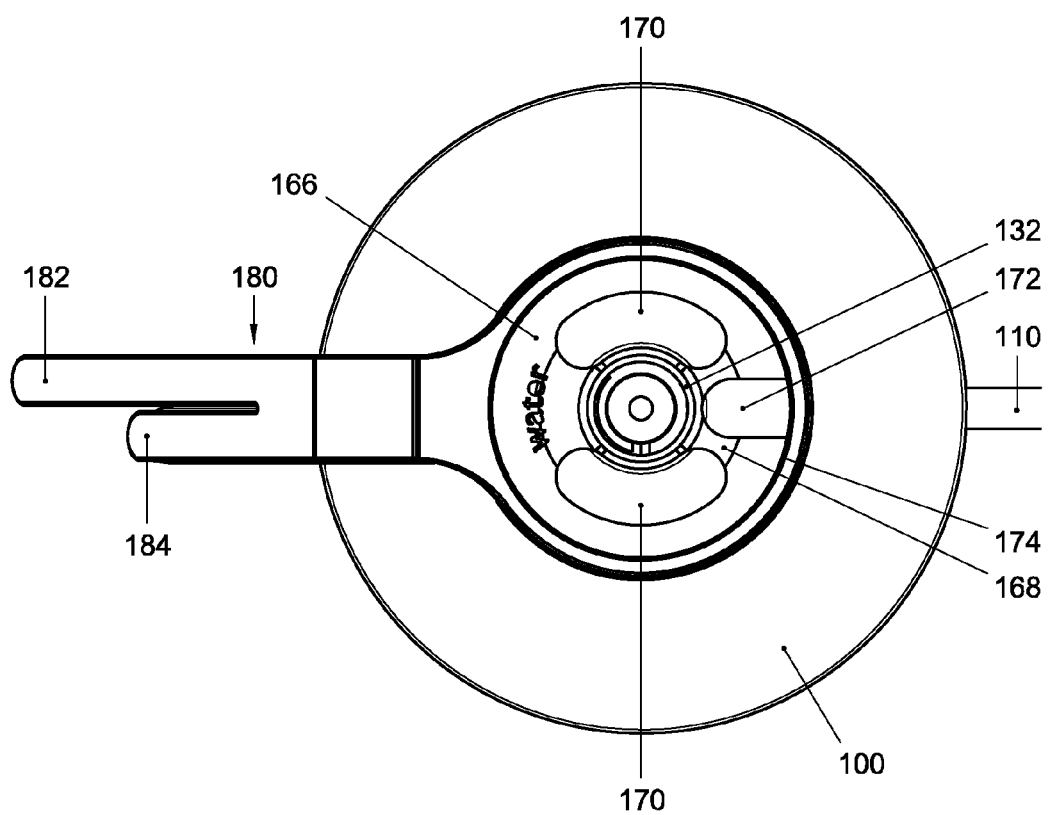
FIG. 3 is a schematic top view of the body of the milk frothing appliance shown in FIGS. 1 and 2, wherein the actuator is removed from the top of the body so as to reveal the sink cover.
Figure 4:
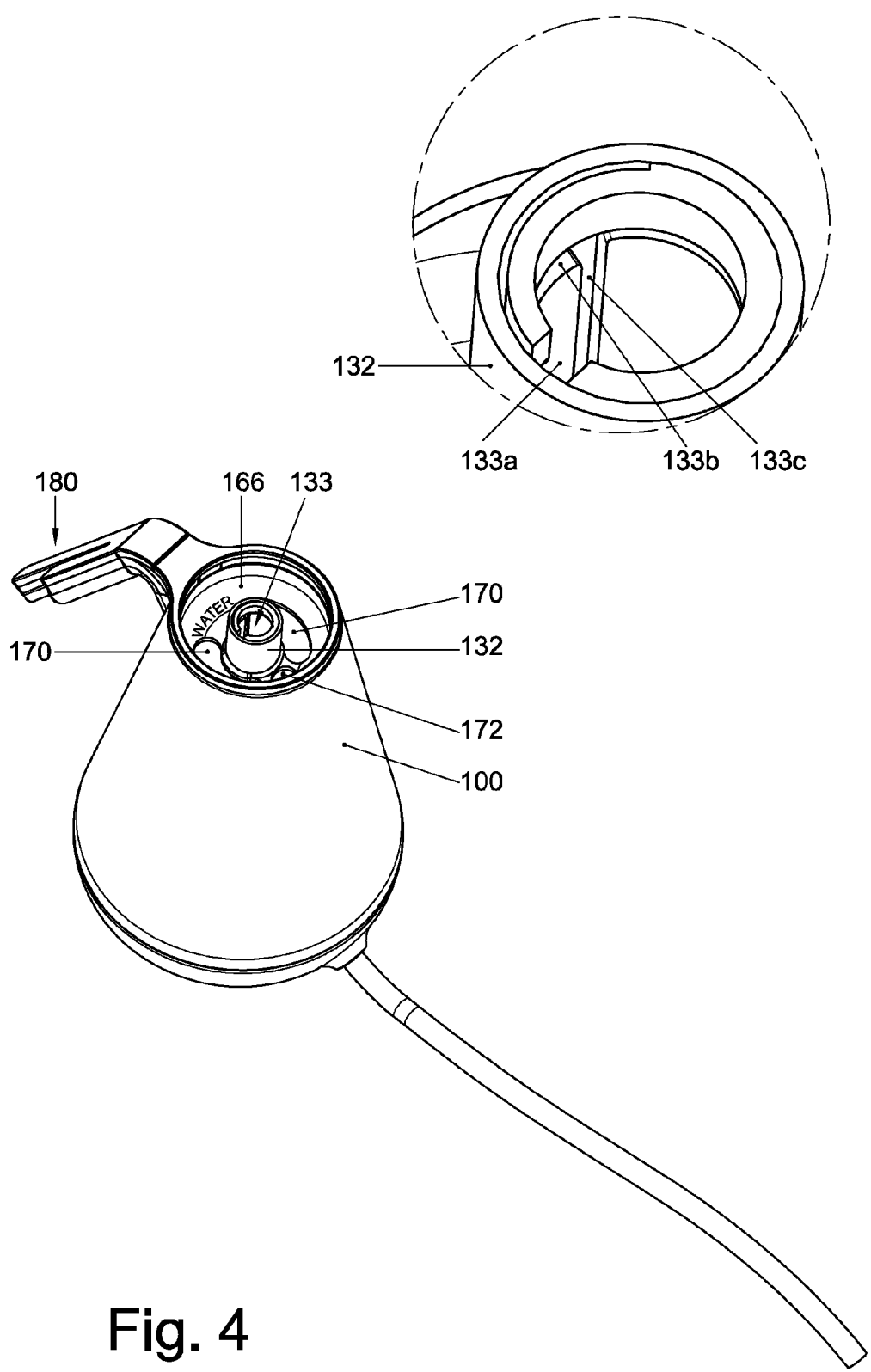
FIG. 4 is a schematic perspective top view of the body of the milk frothing appliance shown in FIGS. 1-4, illustrating in particular the construction of the top end of the cylindrical shaft of the hand pump.

As can be seen best in FIGS. 1 and 2, the milk frothing appliance 1 may include a generally conical body 100 that accommodates a water reservoir 160, a steam generator 200, most of a hand pump 130 for transferring water from the water reservoir 160 to the steam generator 200, and an electrical controller 112. The appliance 1 may further include an actuator 220, which may be disposed on top of the body 100 and be considered to form a part of the hand pump 130, and a milk frothing device 180 that is connected to the body 100 and extends sideways therefrom in a slopingly downward direction. The water reservoir 160, the hand pump 130, the steam generator 200 and milk frothing device 180 may be fluidly connected in series, in that order.

The water reservoir 160 may be defined by a bottom wall 162, a generally conical side wall 164 fitting the contour of the body 100, and a sink cover 166. The sink cover 166 may be integrally formed with a cylindrical shaft 132 of the hand pump 130, around which the water reservoir 160 may be centered. The cylindrical shaft 132 may extend downwards through both the sink cover 166 and the bottom wall 162 of the water reservoir 160. Watertightness of the connection between the bottom wall 162 of the water reservoir 160 and the cylindrical shaft 132 of the hand pump 130 may be effected through an O-ring 150. The sink cover 166 of the water reservoir 160, so named because its appearance is reminiscent of a sink (see FIGS. 3 and 4), may define a bottom wall 168 and an upstanding side wall 174. The bottom wall may define at least one drain opening 170, 172 so as to enable water poured into the sink cover 166 to drain into the water reservoir 160 below it. In the depicted embodiment, as can be seen best in the top view of FIG. 3, the sink cover includes three drain opening: two slotted openings 170 that extend partially around the cylindrical shaft 132, and one smaller opening 174 that extends up to the side wall 174 of the sink cover. The latter drain opening 174 may be configured for cooperation with an electronic switch portion 240 of the actuator 220 and define a rotational ON-position of the actuator, as will be described infra.

As mentioned, the hand pump 130 may include a cylindrical shaft 132 that extends downwardly through the water reservoir 160, and along a central axis L of the body 100. The cylindrical shaft 132 may define a fluid chamber 134 whose volume is determined by the axial position of a piston 136 that is movably arranged within the shaft 132. The piston 136 may be axially moveable between an first or upper position (shown in FIG. 2) and a second or lower position, and be biased towards the upper position by a mechanical spring 137. A piston seal 140 may be provided in a recess in the circumferential wall of the piston 136 to ensure that (pressurized) water does not leak between the shaft 132 and the piston 136 when the latter is axially displaced. The fluid chamber 134 may be in selective fluid communication with the water reservoir 160 via a first one-way or check valve 144 that is disposed just above the bottom wall 162 of the water reservoir 160, and with a water supply end 208 of a steam line 206 of the steam generator 200 via a second one-way valve 148 that is disposed at a lower end of the shaft 132. The two one-way valves 144, 148 may be configured to operate alternately, such that water is sucked into the fluid chamber 134 from the water reservoir 160 when the piston 136 moves upwards in the shaft 132, and water is forced out of the fluid chamber 134 into the steam line 206 of the steam generator 200 when the piston 136 moves downward. The hand pump 130 may preferably be configured such that during a down stroke of the piston about 0.5-5 ml of water is delivered to the steam generator 200. This enables the generation of an amount of steam that is sufficient for a typical cup of milk froth through about one to three pump strokes. One skilled in the art will appreciate that hand pumps, in particular exclusively mechanical hand pumps, come in various types, and that the presently disclosed appliance 1 is not limited to use of the depicted hand pump construction, but may instead employ each of these various types.

The steam generator 200 may comprise a thermal mass 202, for example in the form of a block made of a metal with a relatively great specific heat and thermal conductivity, e.g. aluminum. The thermal mass 202 may accommodate two co-axially wound coils 204, 206. An inner coil may be formed by an electrically resistive heating spiral that serves as a heating element 204, while an outer coil may be formed by the hollow steam line 206, which, for instance, may be made of stainless steel. In operation, water released into the water supply end 208 of the steam line 206 may be virtually instantly evaporated by heat withdrawn from the thermal mass 202, which may have been heated by the heating coil 204 to a temperature well above 100° C., e.g. a temperature in the range of 130° C.-150° C., during a brief preceding heating up phase. The use of the thermal mass 202 may thus promote steady energy consumption from the mains, and consistent steam production. Since the water supply end 208 of the steam line 206 is normally closed by the second check valve 148, water that is evaporated inside the steam line 206 is forced out of the steam line at its steam discharge end under its own pressure. The steam discharge end may be formed by a steam tube 210 that extends from the steam generator 200 is connected to the milk frothing device 180.

The milk frothing appliance 1 according to the present invention may be configured to enable 'in-cup milk frothing', that is milk frothing not within a large internal (milk (froth)) reservoir, but in an external cup. One form of in-cup milk frothing was already mentioned above and includes the steam wand; the milk frothing device according to the presently disclosed appliance may mimic such a steam wand, and, to that end, include little more than a steam outlet pipe. However, to facilitate the frothing process, the milk frothing device may implement a form of in-cup milk frothing in which milk is siphoned from a cup of milk, frothed by the device, and then discharged back into the cup. This is more user friendly as it does not require particular skill on the part of the user, and avoids the necessity to extensively clean an internal milk reservoir of the appliance 1 afterwards: only the steam frothing device needs to be cleaned, which may form a detachable, hand- or machine-washable part of the appliance 1.

Accordingly, the milk frothing device 180 used in the appliance according to the present invention may include two tubes: a milk suction tube 182, and a frothing tube 184. The milk suction tube 182 may be the longer of the two, and extend between a free lower end and an upper end. The frothing tube 184 may also extend between a free lower end and an upper end. In one embodiment (not illustrated), the frothing tube 184 may include two serially arranged Venturi's. A first Venturi may be disposed at the upper end of the frothing tube, and be configured for mixing steam with milk (so as to heat the latter). To this end, an upstream end of the first Venturi may be connected to the steam tube 210, while the downstream end may be connected to the upstream end of the second Venturi. A constriction between the upstream and downstream ends of the first Venturi may be connected to the upper end of the milk suction tube 182, such that, when steam is forced through the first Venturi, milk may be sucked into the steam flow via the milk suction tube to produce a steam-milk mixture. The second Venturi may be disposed just downstream of the first, and be configured for mixing the mixture of steam and milk with air and to thus create the desired heated milk froth; hence, a constriction in the second Venturi may be fluidly connected to the atmospheric environment of the device via an air suction tube.

Figure 6:
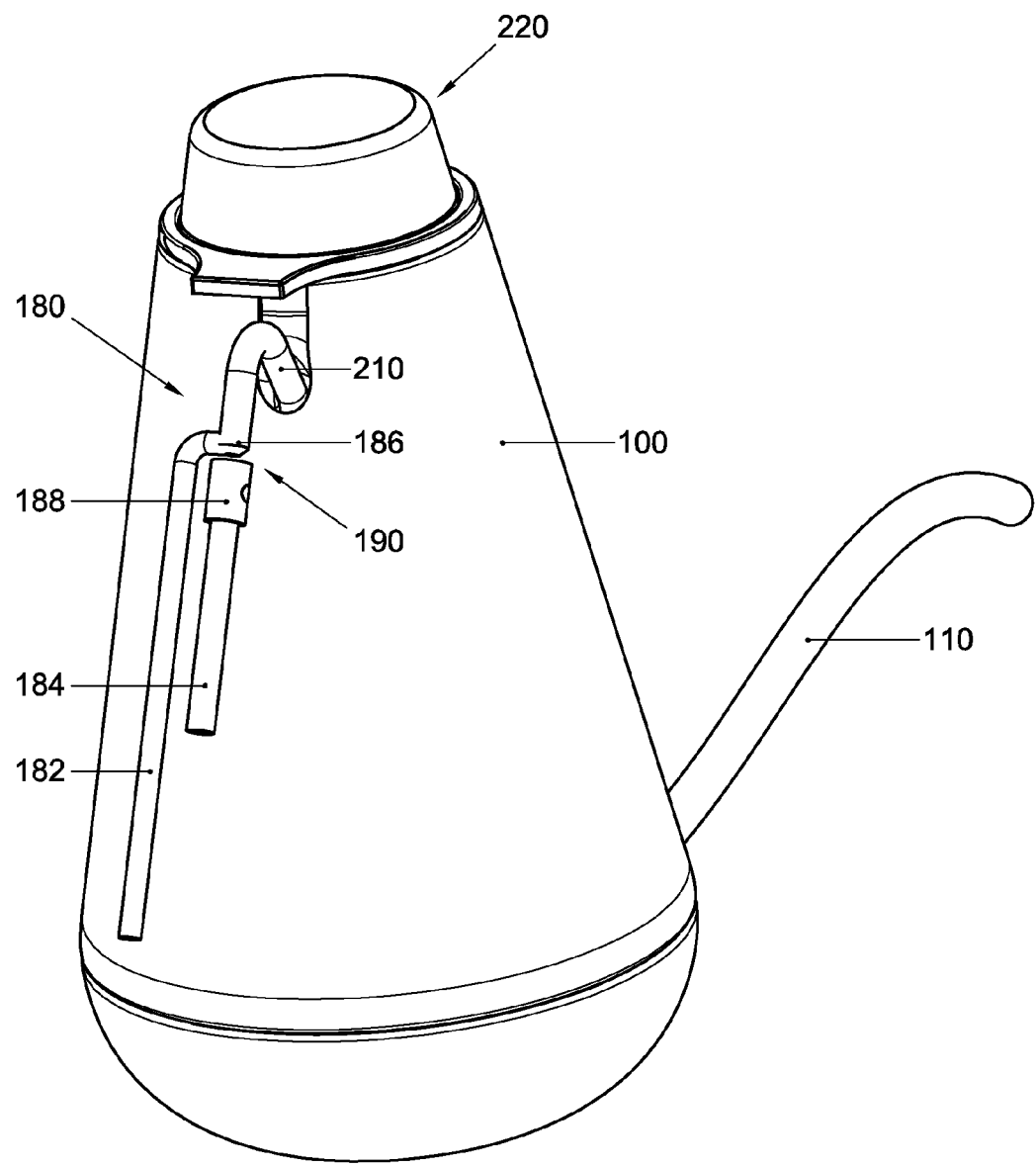
FIG. 6 is a schematic perspective view of the milk frothing appliance shown in FIGS. 1-5, wherein the outer housing of the milk frothing device has been removed to make its internal tubing visible.

As one skilled in the art will appreciate, the milk frothing device 180 may be designed in various ways. In another embodiment, the two above-described Venturi's may for example be combined into one Venturi whose constriction is fluidly connected to both the upper end of the milk suction tube 182 and the air suction tube. In another, preferred embodiment, which is illustrated in FIG. 6 by taking the outer housing off of the tubes 182, 184, the second Venturi may be replaced by a mixing space 188 that is disposed downstream of the first Venturi 186, and that has a relatively large upstream inlet opening spaced apart from the downstream end of the first Venturi 186, in a concentric arrangement therewith, such that an air gap 190 exists between the first Venturi 186 and the mixing space 188. Hence, when, during use, a jet of a mixture of steam and milk flows from the first Venturi 186, it crosses the gap 190 between the first Venturi 186 and the mixing space 188. Under the influence of the jet air is drawn into the air gap 190, such that a mixture of steam, milk and air is received in the mixing space 188. Within the mixing space 188 the steam quickly condenses into the milk, leaving the desired heated milk froth. This latter embodiment of the milk frothing device is described in more detail in International patent application no. PCT/IB2011/052566, which was published as WO/2011/158171, and which is hereby incorporated by reference.

The milk frothing appliance 1 according to the present invention may include relatively little electronics. Besides the (heating element 204 of the) steam generator 200, the milk frothing appliance 1 may comprise a power cord 110, a central controller 112, and a user operable switch 114. The power cord 110 may be connected to the body 100 of the appliance 1, and extend between a plug (not shown) on the outside and the central controller 112 on the inside of the body 100. The central controller 112, in turn, may further be connected to the switch 114 by means of an electrical cable 120, and to the heating element 204 by an electrical cable 122. The controller 112 may be configured to power the heating element 204 when the switch 114 is in an ON-state, and to cut power to the heating element 204 when the switch 114 is in an OFF-state.

The user operable switch 114 may be of any suitable type, and typically include two parts: a first part that is fixedly connected to the body 100, and a second part that is integrated into the actuator 220. The first part may for example include a magnetic sensor 116, e.g. a reed sensor or a Hall sensor, while the second part may include a permanent magnet 118, or vice versa. Just as in the depicted embodiment, the magnetic sensor 116 may be provided on/against an outside of the side wall 164 of the water reservoir 160, near the drain opening 174 in the bottom wall 168 of the sink cover 166 that is configured for cooperation with an electronic switch portion 240 of the actuator 220. The associated permanent magnet 118 may be accommodated in the electronic switch portion 240 of the actuator 220, as will be clarified below. Accordingly, when the actuator 220 is oriented to bring the permanent magnet 118 inside the electronic switch portion 240 thereof to within the vicinity of the magnetic sensor 116, the sensor 116 may detect the magnetic field of the magnet 118 and cause the switch to change from its default OFF-state to its ON-state.

Figure 5:
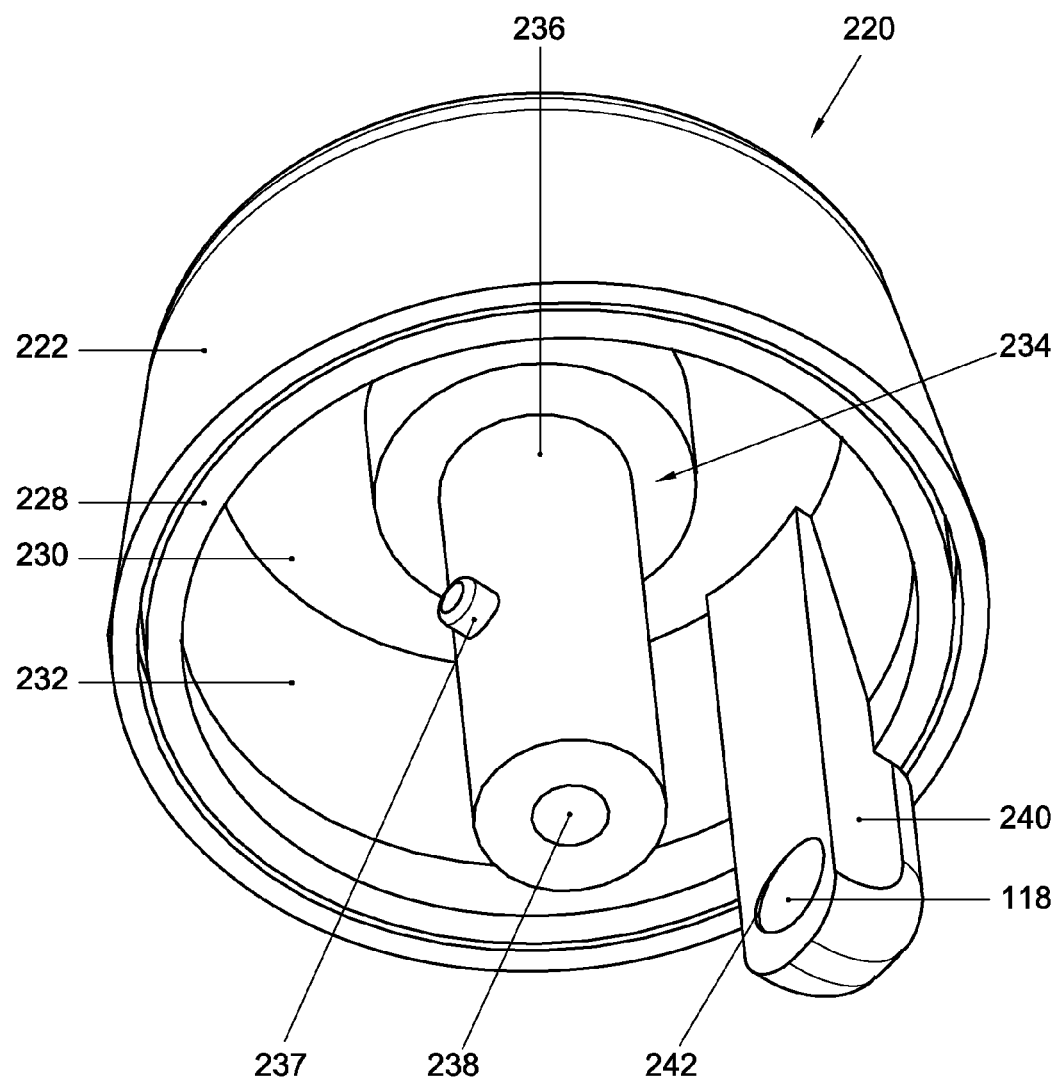
FIG. 5 is a schematic perspective bottom view of the actuator of the milk frothing appliance shown in FIG. 1-4.

The actuator 220 of the milk frothing appliance 1, which is shown in isolation in FIG. 5, may enable the apparatus' operation. More particularly, the actuator 220 may serve as a lid for the sink cover 166, as an actuator for the hand pump 130, and/or as a control switch for the electronics of the appliance 1, including in particular the steam generator 200. In the depicted embodiment the actuator 220 fulfils all three functions, but in alternative embodiments it may merely fulfil one or two of them.

The actuator 220 may include an outer shell 222 and an inner shell 228. Both shells 222, 228 may be generally cup shaped, having a central wall portion 224, 230 and an upstanding side wall 226, 232 provided along the circumference of the central wall portion 224, 230. The outer shell 222, which may be visible from the outside of the appliance 1 (see FIG. 1), may be provided with an aesthetically pleasing appearance, e.g. by manufacturing it from brushed metal. The inner shell 228, which may be manufactured from plastic, for instance by means of injection molding, may define a hand pump interface portion 234 and an electronic switch portion 240. The construction and operation of both portions 234, 240 will be elucidated in turn.

The hand pump interface portion 234 may be configured to interface with the cylindrical shaft 132 and the piston 136 of the hand pump 130. It may include a cylindrical shaft insert 236 that is centrally arranged on and protrudes perpendicularly from the central wall portion 230 of the inner shell 228. An outer diameter of the shaft insert 236 may be slightly smaller than an inner diameter of an upper end the cylindrical shaft 132 of the hand pump 130, such that the shaft insert 236 may be slid into the upper end of the cylindrical shaft 132 to connect to the piston 136. The proper connection between the shaft insert 236 and the piston 136 may be facilitated by providing each with a half of a pair of mating male-female connectors. For instance, in the depicted embodiment, the piston 136 is provided with a central pin 138 while the shaft insert 236 is provided with a matching socket 238. The overall axial length of the shaft insert 236 may be chosen such that, when the shaft insert 236 is inserted in the cylindrical shaft 132 of the hand pump 130 and rests upon the piston 136 in its upper position, the cup-shaped portions 222, 228 of the actuator 220 occupies a rest position from which it may be displaced downwards, effectively into the space defined by the sink cover 166, so to force the piston 136 into its lower position and to effect a pump stroke that displaces water from the fluid chamber 134 of the hand pump 130 into the water supply end 208 of the steam line of the steam generator 200.

To enable the actuator 220 to be removably locked to the rest of the appliance 1, the hand pump interface portion 234 of the actuator 220 on the one hand, and the upper end of the cylindrical shaft 132 and the piston 136 of the hand pump 130 on the other may define a bayonet mount. The shaft insert 236 of the hand pump interface portion 234 may for example be provided with one or more radially outwardly protruding pins 237, while an inner wall of the upper end of the cylindrical shaft may be provided with one or more respective corresponding angular slots 133, or vice versa.

In the depicted embodiment (see in particular FIGS. 4 and 5), the shaft insert 236 is provided with one pin 237 at a position diametrically opposite to the electronic switch portion 240. The inner wall of the upper end of the cylindrical shaft 132 is complementarily provided with one matching angular slot 133 that includes three straight slot sections 133*a*,*b*,*c*. A first 133*a* and third 133*c* of the slot sections extend in parallel along the central axis L of the cylindrical shaft 132, and a second 133*b* interconnects the two at right angles. The first and second slot sections 133*a*, 133*b* form part of the lock of the bayonet mount: the actuator 220 may be positioned on top of the body 100 by inserting its shaft insert 236 into the upper end of the cylindrical shaft 132 of the hand pump 130, such that the pin 237 on the shaft insert 236 slides downwards into the first (axially extending) slot section 133*a*. On its way down the shaft insert 236 may engage the spring biased piston 136, such that further downward travel compresses the spring 137 slightly. Once the pin 237 encounters the lower end of the first slot section 133*a*, the actuator 220 may be turned clockwise through an angle of about 45° around the central axis L of the appliance 1, so that the pin 237 slides tangentially through the second slot section 133*b* to a point halfway thereof. This point may define a rotational OFF-position of the actuator 220. Due to the upward action of the spring biased piston 136 against the shaft insert 236, the actuator 220 may be frictionally locked in place in this OFF-position. From the OFF-position, the actuator 220 may be turned in either an anti-clockwise direction, e.g. as a first step in executing the above steps in reverse to remove the actuator 220 from the body 100, or a clockwise direction. The actuator 220 cannot be moved up or down, for instance because the pin 237 in the horizontally extending second slot section 133*b* prohibits such motion. When the actuator 220 is turned further in the clockwise direction, e.g. through a total angle of about 90°, the pin 237 encounters an end of the second slot section 133*b*, which may correspond to an upper end of the third slot section 133*c*. This position of the actuator 220 may define the rotational ON-position referred to above, and allow for movement for up and down movement of the actuator 220 along the axial direction L because (i) the pin 237 now resides in the axially extending third slot section 133*c*, and (ii) the electronic switch portion 240 of the actuator 220 is in axial registry the drain opening 172 that is configured for cooperation therewith.

The electronic switch portion 240 of the actuator 220 may be formed by a peg that is provided on or partially incorporated into the upstanding side wall 232 of the inner shell 228 of the actuator 220, and that axially protrudes beyond the lower or free edge thereof. At least the lower, protruding end of the peg may be dimensioned to be receivable into the drain opening 172 during axial up and down movement of the actuator 220 along the cylindrical shaft 132. The peg may configured as the control for the user operable electronic switch 114, and to that end include a cavity 242 that accommodates the permanent magnet 118 of the switch discussed above.

The actuator 220 may thus be rotated around the central axis L between three different positions which, in clockwise order, include: a position in which the actuator 220 is detachable from the body 100 by pulling it upwards; an OFF-position in which the actuator 220 cannot be moved up- or downwards, and the magnet 118 of the electronic switch portion 240 is spatially separated from the magnetic sensor 116 sufficiently far to prevent the switch 114 from switching to the ON-position; and an ON-position in which the actuator 220 can be moved up- and downwards along the central axis L, and in which the magnet 118 of the electronic switch portion 240 resides within the vicinity of the magnetic sensor 116, causing the switch 114 to be in the ON-state.

Upon use, a user may first detach the actuator 220 from the body 100 to refill the water reservoir 160 by pouring water into the sink cover 166, until the water does no longer drain therefrom indicating that the water reservoir 160 is full. To refill the reservoir 160, the user may conveniently use the hollow, cup-shaped actuator 220 as a small water bucket to transfer water from a tap into the sink cover 166. This mode of operation does away with the hassle of holding the appliance 1 in a sink to position the sink cover 166 under a tap, and overcomes the need for a split body design, in which the appliance would include a power base and jug that is detachably connectable thereto, as is common in conventional electric kettles. Once the reservoir is filled, the user may reattach the actuator 220, and turn it around the central axis L through its OFF-position into its ON-position. This will cause the central controller 112 to power the heating element 204 of the steam generator 200 in order to heat up the thermal mass 202 thereof to a temperature well above 100° C. After a brief heating up phase, the user may displace the actuator 220 along the central axis L to feed liquid water from the water reservoir 160 into the steam line 208 extending through the heated thermal mass 202 of the steam generator 200. This will cause the liquid water to be evaporated virtually instantly, and steam will be forced out of the steam generator 200 through the steam tube 210 that is connected to milk frothing device 180. A cup of milk may be held at the lower end of the milk suction tube 182 of the milk frothing device, such that milk may be siphoned therefrom, frothed inside the frothing tube 184, and subsequently discharged back into the cup. When the frothing process is completed, the user may rotate the actuator back from its ON-position to its OFF-position to cut off power to the heating element 204 of the steam generator 200.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, it is noted that particular features, structures, or characteristics of one or more embodiments may be combined in any suitable manner to form new, not explicitly described embodiments.

LIST OF ELEMENTS 1 milk frothing appliance
100 body
110 power cord
112 central controller
114 user operable switch (switchable between ON/OFF-states)
116 magnetic sensor reed contact
118 permanent magnet
120 electric cable between controller and magnetic sensor
122 electric cable between controller and heating coil
130 hand pump
132 cylindrical shaft
133 slot for cooperation with radial pin on shaft insert of actuator
134 fluid chamber
136 piston
137 mechanical spring
138 piston center pin
140 O-ring around piston
142 water inlet
144 first or water inlet check valve
146 water outlet
148 second or water outlet check valve
150 O-ring between bottom wall of water reservoir and cylindrical shaft
160 water reservoir
162 bottom wall of water reservoir
164 (conical) side wall of water reservoir
166 sink cover
168 bottom wall of sink cover
170 slotted drain opening in bottom wall of sink cover
172 drain opening in bottom wall of sink cover configured to receive electronic switch portion of actuator
174 side wall of sink cover
180 milk frothing device
182 milk suction tube (long leg)
184 frothing tube (short leg)
186 Venturi
188 mixing chamber
190 air gap
200 steam generator
202 thermal mass
204 heating element
206 steam line for steam generation
208 water supply end of steam line
210 steam discharge end of steam line steam tube
220 actuator
222 cup-shaped outer shell of actuator (metal)
224 central wall of outer shell
226 side wall of outer shell
228 inner shell of actuator (plastic)
230 central wall of inner shell
232 side wall of inner shell
234 hand pump interface portion
236 shaft insert
237 radially extending pin on shaft insert
238 piston center pin reception recess
240 electronic switch portion
242 cavity for magnet
L central axis of body

The invention claimed is:

1. A milk frothing appliance, comprising:
a water reservoir;
a steam generator;
a milk frothing device that is fluidly connected to the steam generator; and
a hand pump that is fluidly connected to both the water reservoir and the steam generator, the hand pump comprising a manually operable actuator that is moveable between a first actuator position and a second actuator position, and that upon movement from the first actuator position into the second actuator position causes displacement of fluid from the water reservoir to the steam generator, wherein the actuator is moveable between a third actuator position and a fourth actuator position, and
wherein supply of electric power to the milk frothing appliance is disabled when the actuator is in the third actuator position, while supply of electric power to the milk frothing appliance is enabled when the actuator is in the fourth actuator position.

2. The milk frothing appliance according to claim 1, wherein the hand pump, upon a movement of the actuator from the first actuator position to the second actuator position, delivers 0.5-5 ml of fluid to the steam generator.

3. The milk frothing appliance according to claim 1, wherein the actuator is moveable between the first actuator position and the second actuator position by translation along a first axis.

4. The milk frothing appliance according to claim 1, wherein the actuator is moveable between the third actuator position and the fourth actuator position by rotation around the first axis.

5. The milk frothing appliance according to claim 4, wherein the actuator in the third actuator position is locked against movement between the first actuator position and the second actuator position, while the actuator in the fourth actuator position is moveable between the first actuator position and the second actuator position.

6. A milk frothing appliance comprising:
a water reservoir;
a steam generator;
a milk frothing device that is fluidly connected to the steam generator; and
a hand pump that is fluidly connected to both the water reservoir and the steam generator, the hand pump comprising a manually operable actuator that is moveable between a first actuator position and a second actuator position, and that upon movement from the first actuator position into the second actuator position causes displacement of fluid from the water reservoir to the steam generator, wherein the actuator is moveable between a third actuator position and a fourth actuator position, and wherein the steam generator is an electrically powered steam generator, and
wherein supply of electric power to the steam generator is disabled when the actuator is in the third actuator position, while supply of electric power to the steam generator is enabled when the actuator is in the fourth actuator position.

7. The milk frothing appliance according to claim 6, further comprising:
a controller that is operably connected to the steam generator for controlling the supply of electric power thereto;
a user operable switch; including:
a magnetic sensor that is operably connected to the controller;
a magnet;
wherein one of said magnetic sensor and said magnet is incorporated into the actuator; and
wherein the controller and the user operable switch are configured such that, when the actuator is in the fourth actuator position, the controller registers the magnet's presence in the magnetic sensor's proximity and enables the supply of electric power to the steam generator.

8. The milk frothing appliance according to claim 7, wherein the steam generator includes a thermal mass, an electrically powered heating element configured to heat the thermal mass, and a steam line that is at least partly embedded in the thermal mass, and that fluidly connects a water outlet of the hand pump to the milk frothing device.

9. The milk frothing appliance according to claim 8, further comprising at least one water reservoir water inlet opening, and
wherein the actuator is removably connected to the hand pump and acts as a cover for the at least one water inlet opening, such that the actuator blocks access to the water inlet opening when it is connected to the hand pump, while access to the water opening is provided upon removal of the actuator therefrom.

10. The milk frothing appliance according to claim 9, wherein the hand pump further comprises a fluid chamber having a water inlet and a water outlet, a piston that is moveably arranged within the fluid chamber and operably connectable to the actuator, and two opposingly operating check valves one of which is arranged in the water inlet of the fluid chamber and one of which is arranged in the water outlet of the fluid chamber.

11. The milk frothing appliance according to claim 1, comprising an electronic component, wherein the supply of electric power to the electronic component is disabled when the actuator is in the third actuator position, while supply of electric power to the electronic component is enabled when the actuator is in the fourth actuator position.

12. The milk frothing appliance according to claim 11, wherein the electronic component is a controller that controls operation of the milk frothing appliance.

13. The milk frothing appliance according to claim 12, wherein the controller is operably connected to the steam generator and is configured to control operation of the steam generator.

14. The milk frothing appliance according to claim 1, wherein the steam generator comprises a heating element, wherein the supply of electric power to the heating element is disabled when the actuator is in the third actuator position, while supply of electric power to the heating element is enabled when the actuator is in the fourth actuator position.

15. The milk frothing appliance according to claim 1, further comprising:
a controller that is operably connected to the steam generator for controlling the supply of electric power thereto;
a user operable switch controlled by the actuator; and
wherein the controller and the user operable switch are configured such that, when the actuator is in the fourth actuator position, the controller enables the supply of electric power to the steam generator.

* * * * *